United States Patent
Condict et al.

(10) Patent No.: US 10,530,870 B2
(45) Date of Patent: Jan. 7, 2020

(54) DIRECT VOLUME MIGRATION IN A STORAGE AREA NETWORK

(71) Applicant: Lenovo Enterprise Solutions (Singapore) Pte. Ltd., Singapore (SG)

(72) Inventors: Michael N. Condict, Hurdle Mills, NC (US); Jonathan R. Hinkle, Raleigh, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 187 days.

(21) Appl. No.: 15/397,785

(22) Filed: Jan. 4, 2017

(65) Prior Publication Data

US 2018/0191839 A1    Jul. 5, 2018

(51) Int. Cl.
*G06F 15/173* (2006.01)
*H04L 29/08* (2006.01)

(52) U.S. Cl.
CPC ........ *H04L 67/148* (2013.01); *H04L 67/1097* (2013.01)

(58) Field of Classification Search
CPC ................. H04L 67/148; H04L 67/1097
See application file for complete search history.

(56) References Cited

U.S. PATENT DOCUMENTS

| | | | | |
|---|---|---|---|---|
| 2006/0136691 A1* | 6/2006 | Brown | .................... | G06F 3/061 711/165 |
| 2008/0126437 A1* | 5/2008 | Chiba | ............... | G06F 17/30079 |
| 2012/0137098 A1* | 5/2012 | Wang | .................... | G06F 3/0617 711/165 |

OTHER PUBLICATIONS vmblog.com, "Want Live Migration? No SAN? No NAS? No Problem Says Thinsy Corporation : @VMblog", http://vmblog.com/archive/2008/01/18/want-live-migration-no-san-no-nas-no-problem-says-thinsy-corporation.aspx#.V6NUZfkrJhF, Jan. 18, 2008, 1 page.
Tarry Singh, "Thinsy Corporation Announces Next Generation Virtualization Software With Integrated Storage Intelligence for SATA, SAS and RAID Direct Attached Stora" Digital Transformation, http://tarrysingh.com/2008/09/thinsy-corporation-announces-next-generation-virtualization-software-with-integrated-storage-intelligence-for-sata-sas-and-raid-d . . . , Sep. 12, 2008, 5 pages.

* cited by examiner

*Primary Examiner* — Hua Fan
(74) *Attorney, Agent, or Firm* — Jeffrey L. Streets

(57) ABSTRACT

A method, computer program product and apparatus are provided. For example, the method includes receiving, by a first data storage device within a storage area network, input output operations over a first network pathway within the storage area network. The method further includes receiving, by the first data storage device, a migration instruction that identifies a second data storage device within the storage area network and a source volume stored on the first data storage device. Still further, the method includes migrating, by the first data storage device, the source volume directly to the second data storage device over a second network pathway within the storage area network.

24 Claims, 7 Drawing Sheets

US 10,530,870 B2

DIRECT VOLUME MIGRATION IN A STORAGE AREA NETWORK

BACKGROUND

The present disclosure relates to data migration in a storage area network.

BACKGROUND OF THE RELATED ART

A storage area network (SAN) is a network that provides multiple servers with block-level access to data storage devices that appear to the operating systems of those servers as if the data storage devices are directly attached to the respective server. In a conventional SAN that is implemented with passive hard disk drives attached to a storage controller via SATA or SAS, volume migration is implemented by reading all the data of the volume from the source drive and writing all the data of the volume to the target drive. This requires all of the data to pass over SATA or SAS cables twice, including once while reading the data from the source drive and then again while writing the data to the target drive. Moreover, the cables that are used to migrate data are the same cables needed for performing user access to the data storage devices, such that the performance of reading and writing to the data storage devices will be negatively impacted while migration is taking place.

BRIEF SUMMARY

One embodiment provides a method comprising receiving, by a first data storage device within a storage area network, input output operations over a first network pathway within the storage area network; receiving, by the first data storage device, a migration instruction that identifies a second data storage device within the storage area network and a source volume stored on the first data storage device; and migrating, by the first data storage device, the source volume directly to the second data storage device over a second network pathway within the storage area network.

Another embodiment provides a computer program product comprising computer readable storage media that is not a transitory signal having program instructions embodied therewith, the program instructions executable by a processor of a first data storage device within a storage area network to: receive input output operations over a first network pathway within the storage area network; receive a migration instruction that identifies a second data storage device within the storage area network and a source volume stored on the first data storage device; and migrate the source volume directly to the second data storage device over a second network pathway within the storage area network.

Yet another embodiment provides an apparatus, comprising at least one storage device for storing program instructions, and at least one processor for processing the program instructions to: receive input output operations over a first network pathway within a storage area network; receive a migration instruction that identifies a source volume stored on a first data storage device operatively coupled to the processor and a second data storage device within the storage area network to receive the source volume; and migrate the source volume directly to the second data storage device from the first data storage device over a second network pathway within the storage area network.

DETAILED DESCRIPTION

Figure 1:
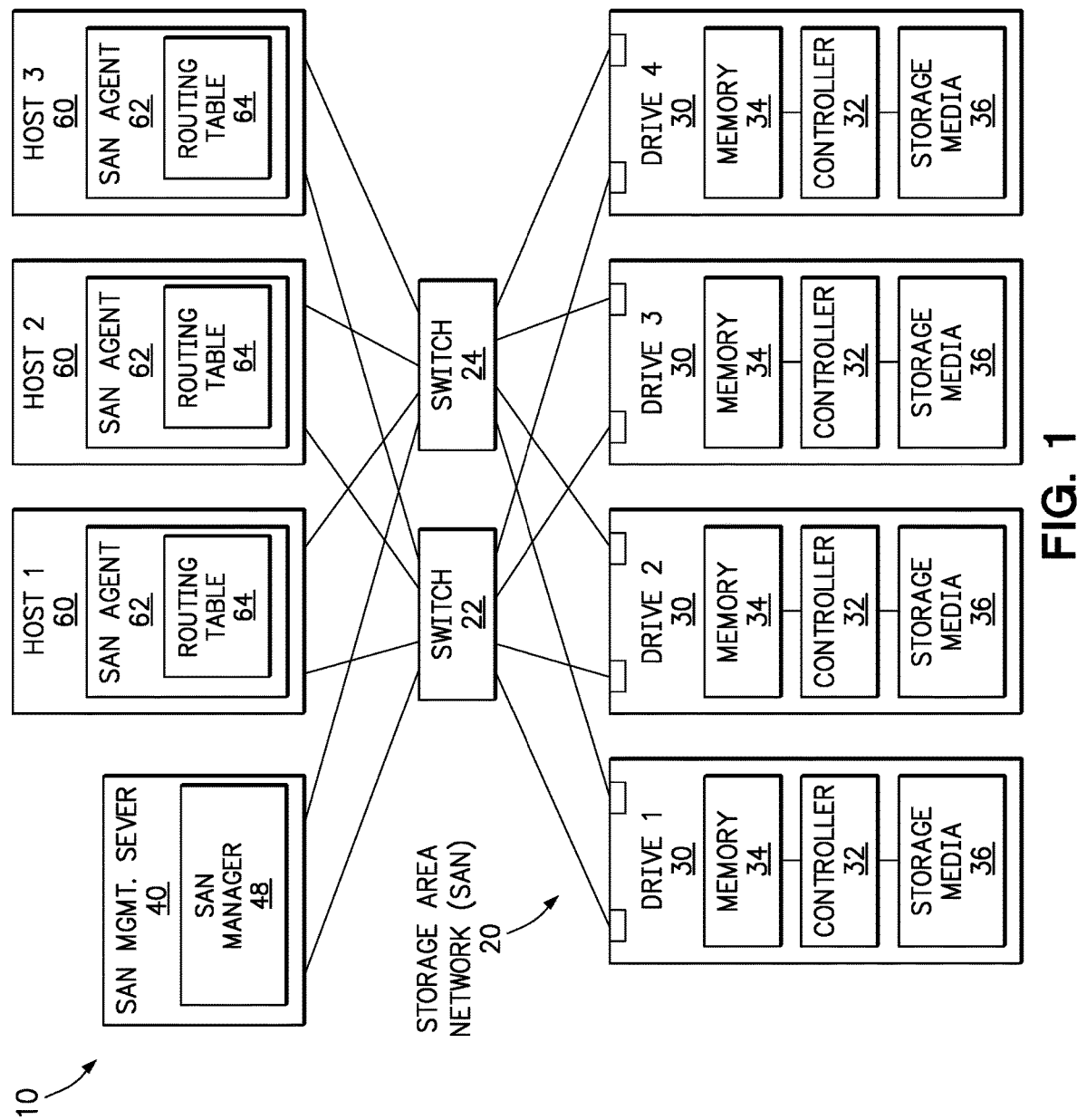
FIG. 1 is a diagram of a computer system including a storage area network having a plurality of data storage devices.

One embodiment provides a method comprising receiving, by a first data storage device within a storage area network, input output operations over a first network pathway within the storage area network; receiving, by the first data storage device, a migration instruction that identifies a second data storage device within the storage area network and a source volume stored on the first data storage device; and migrating, by the first data storage device, the source volume directly to the second data storage device over a second network pathway within the storage area network.

Optionally, the storage area network may be connected to another network, such as a local area network, that includes a storage management server and one or more host devices. The host devices may be individual client devices or servers that use the storage area network for various data storage needs. In one embodiment, a local area network includes a plurality of host devices that each execute a storage area network (SAN) agent application, and the storage management server (or storage area network (SAN) management server) executing a SAN manager application.

Each data storage device has a controller, such as a processor for processing program instructions. For example, a programmable data storage device may have a processor that executes program instructions for peer-to-peer migration of the source volume. The first or second data storage device may including a processor for processing program instructions to perform additional actions according to one or more embodiments. Still further, the programmable data storage device may also include data storage media, such as a hard disk drive, solid state drive, optical disk drive or any other data storage media. Various embodiments may be implemented via program instructions in the SAN agent application on a host device, the SAN manager application on the storage management server, and/or the migration logic on the programmable data storage devices.

In various embodiments, the source volume may be migrated directly from one data storage device to another without passing the data of the source volume through the storage management server. For example, the storage management server may handle normal I/O operations, such as read and write operations, with a first data storage device over a first network pathway while the first data storage device is migrating a source volume to a second data storage device over a second network pathway. The first and second pathways may both be within the storage area network, but the migration will preferably proceed on the second network pathway without causing latency in I/O operations being carried out over the first network pathway. Each data storage device may have multiple I/O ports for this purpose, such that one port may be used for I/O operations while the other port may be used for migrating the source volume. Furthermore, the first network pathway may include a first switch and the second network pathway may include a second switch, wherein each of the first and second switches are connected to a separate port of each data storage device.

Optionally, the storage management server may detect a load imbalance between the first and second data storage devices. For example, load may be measured in terms of a number of I/O operations per unit time directed at a given data storage device, an average bandwidth to and from a given data storage device, or other similar measures. In order to reduce the load imbalance, the storage management server may select the second data storage device and the source volume on the first data storage device. Using load data for each data storage device and/or each volume on each data storage device, the storage management server may identify a source volume that, if migrated to an identified data storage device, would reduce the load imbalance.

Regardless of the purpose for migrating a source volume, the storage management server may send a receive-migration request to the second (target) data storage device, wherein the receive-migration request identifies a size of the source volume. Accordingly, the second data storage device may prepare a target volume having the identified size for receiving and storing the source volume. As used herein, a "receive-migration" request or instruction is directed to the data storage device that will receive the source volume being migrated. Similarly, the term "target" is used herein to refer to a data storage device or volume on a data storage device that will receive the data of the source volume being migrated. Conversely, the "send-migration" request or instruction is directed to the data storage device that will migrate or send the source volume to the target device or volume. The term "source" is used herein to refer to a data storage device or volume on a data storage device that includes the volume that is to be migrated or is in the process of being migrated.

Embodiments of the method will preferably further include the first data storage device sending the source volume to the target volume on the programmable data storage device in chunks. These "chunks" are portions of the data in the source volume, where the chunks may be variably or uniformly sized. For example, a chunk may be one or more block of data or some number of bytes of data. However, a chunk may be whatever amount of data is being used to track progress of the migration. For example, the second programmable data storage device may send an acknowledgement back to the first programmable data storage device for each chunk received. In a further option, the second programmable data storage device may store the received chunks at addresses in the target volume that are the same as addresses of the chunks from the source volume.

Other embodiments of the method may further include the first data storage device creating a bit-map file that identifies, for each chunk of the source volume, whether the first data storage device has received an acknowledgement back from the second data storage device. It should be recognized that the bit-map may be much smaller than the source volume. In particular, a preferred bit-map may have a single bit for each chunk of the source volume. For example, each bit in the bit-map may be associated with one chunk of the source volume, and each bit may have either a logical value of "0" to indicate that no acknowledgement has been received for the associated chunk or a logical value of "1" to indicate that an acknowledgement has been received for the associated chunk. In this example, a bit-map will have all "0"s prior to initiating the migration and will have all "1"s upon completion of the migration. Once the migration of the source volume has completed, the first data storage device may delete the bit-map file and de-allocate the source volume.

In one optional embodiment, the method may further include detecting whether the migration has stopped before completing. For example, migration may stop due to a component failure or power loss. If the migration has stopped before completing, the method may restart the migration of the source volume from the first data storage device directly to the second data storage device without resending those chunks that have been acknowledged as being received by the second data storage device. Accordingly, upon restarting the migration, the first data storage device may send only those chunks of the source volume that the bit-map identifies as having not received an acknowledgement back from the second data storage device.

Further embodiments of the methods are directed at handling an input/output (I/O) operation, either a read operation or a write operation, which the first programmable data storage device receives from a host device during migration of the source volume. The manner of handling the I/O operation depends upon whether the I/O operation is directed at a portion of the migrating source volume that has already been sent to the target volume or is directed at a portion of the migrating source volume that has not yet been sent to the target volume. In embodiments using a bit-map, a portion or chunk of the source volume may be determined to have already been sent to the target volume if the bit associated with the particular portion or chunk has a logical value (i.e., "1") indicating that the source device has previously received an acknowledgement that the portion or chunk was successfully received by the target device. Conversely, a portion or chunk of the source volume may be determined to have not yet been sent to the target volume if the bit associated with the particular portion or chunk has a logical value (i.e., "0") indicating that the source device has not received an acknowledgement that the portion or chunk was successfully received by the target device.

In a first instance, in response to the first data storage device receiving from a host device, during migration of the source volume, an I/O operation directed at a portion of the migrating volume that has already been sent to the target volume, the first data storage device may forward the I/O operation to the target volume, receive a reply from the target volume, and forward the reply to the host. Where the I/O operation is a read request, the reply may be data responsive to the read request. Where the I/O operation is a write request, the reply may be an acknowledgement that the requested write has been performed.

In a second instance, in response to the first data storage device receiving from a host device, during migration of the source volume, an I/O operation directed at a portion of the source volume that has not yet been sent to the target volume, the first data storage device may perform the I/O operation in a normal manner without regard to the fact that a migration is occurring.

In a third instance, in response to the first data storage device receiving from a host device, during migration of the source volume, an I/O operation directed at a first portion of the source volume that has not yet been sent to the target volume and a second portion of the source volume that has already been sent to the target volume, the first data storage device may perform the I/O operations on the first portion and forward the I/O operations on the second portion to the target volume. Where the I/O operation is a read operation, the method may combine I/O data from the first data storage device and I/O data from the second data storage device into a single response from the first data storage device to the host device. Where the I/O operation is a write operation, the method may combine an acknowledgement from the first data storage device and an acknowledgement from the second data storage device into a single acknowledgement from first data storage device to the host device.

In a further embodiment of the method, the first data storage device may send a "migration complete" message to the storage management server in response to completing the migration. Subsequently, the storage management server may notify the SAN agent on the host computer to adjust its routing table so that any new I/O operation on the migrated volume is sent to the target device. For example, the host device may finish any active I/O operations directed at the first data storage device, and then update a routing table to point to the target volume on the second data storage device. In this manner, the host computer may direct I/O operations to the source volume on the first data storage device prior to migration and may direct further I/O operations to the target volume on the second data storage device after migration has completed.

In various embodiments, the methods may further include assigning a migration identifier to the migration of the source volume, and providing the migration identifier to the first data storage device in the send-migration request and providing the migration identifier to the second data storage device in the receive-migration request. Using the migration identifier, such as a serial number or other unique code, facilitates tracking the progress of the migration and identifying the chunks that are being migrated. Furthermore, when the migration is complete, the migration complete message may include the migration identifier for the migration that completed, which facilitates various processes, such as the deletion of the migration bit-map and deallocation of the source volume.

Another embodiment provides a computer program product comprising computer readable storage media that is not a transitory signal having program instructions embodied therewith, the program instructions executable by a processor of a first data storage device within a storage area network to: receive input output operations over a first network pathway within the storage area network; receive a migration instruction that identifies a second data storage device within the storage area network and a source volume stored on the first data storage device; and migrate the source volume directly to the second data storage device over a second network pathway within the storage area network. The foregoing computer program product may include program instructions further executable by the processor for implementing or initiating any one or more aspects of the embodiments described herein.

Yet another embodiment provides an apparatus, comprising at least one storage device for storing program instructions, and at least one processor for processing the program instructions to: receive input output operations over a first network pathway within a storage area network; receive a migration instruction that identifies a source volume stored on a first data storage device operatively coupled to the processor and a second data storage device within the storage area network to receive the source volume; and migrate the source volume directly to the second data storage device from the first data storage device over a second network pathway within the storage area network. The foregoing apparatus may further process the program instructions to implement or initiate any one or more aspects of the embodiments described herein.

FIG. 1 is a diagram of a computer system 10 including a storage area network 20 having a plurality of data storage devices 30. A storage area network (SAN) management server 40 and a plurality of host devices 60 may be connected to the storage area network 20. The computer system 10 facilitates the SAN management server 40 and any of the host devices 60 providing I/O operations to any of the data storage devices 30, which may be hard disk drives, solid state drives, optical disks, other types of data storage devices, and combinations thereof.

Each host device 60 includes a SAN agent 62, which may be embodied in software, which routes I/O operations to the appropriate volumes stored on the appropriate data storage device 30. For this purpose, the SAN agent 62 may include a routing table 64 that points to a volume on a given data storage device 30 where certain files are being stored. The SAN agent 62 may be loaded at a low level that is not visible to applications on the host device 60 that are using the SAN 20.

Each data storage device 30 may include a programmable controller 32, memory 34, and storage media 36, such as a hard disk or a solid state drive. Migration logic may be stored one the storage media and loaded into memory for execution by the programmable controller 32, which may include a processor that executes the migration logic to perform steps consistent with one or more method embodiments. The storage area network 20 further includes a first switch 22 and a second switch 24 for enabling communication among the data storage devices 30, the storage management server 40, and the plurality of data storage devices 30.

In various embodiments, a source volume may be migrated from a first programmable data storage device 30 ("source device") to a second programmable data storage device 30 ("target device") without passing the source volume through the storage management server 40. For example, normal I/O operations of a host device 60, such as read and write operations, may be directed to a first programmable data storage device 30 (i.e., Drive 2) over a first network pathway (i.e., via a first switch 22) while the first programmable data storage device 30 (i.e., Drive 2) is migrating a source volume to a second programmable data storage device 30 (i.e., Drive 4) over a second network pathway (i.e., via a second switch 24). The first and second network pathways may both be within the storage area network 20, but the migration will preferably proceed on the second network pathway without causing latency in I/O operations being carried out over the first network pathway. Each data storage device 30 may have multiple I/O ports for this purpose, such that one port may be used for I/O operations while the other port may be used for migrating the source volume. Furthermore, the first network pathway may include a first switch 22 and the second network pathway may include a second switch 24, wherein each of the first and second switches 22, 24 are connected to separate ports of each data storage device 30.

Accordingly, the source volume that is being migrated is sent over the network just once instead of two or three times as would be the case if the source volume was passed through the storage management server 40. This manner of handling the migration helps enable further storage scaling and balancing across independent network-attached drives without being disruptive to live workloads running on the host devices (i.e., storage clients). For example, when a new data storage device is added to the storage area network, the new device will be empty while other data storage devices in the storage area network may be nearly full and heavily used. The peer to peer data transfer methods described herein enable migration to balance the data storage or balance the I/O load without reducing the performance of I/O operations for the host devices. Furthermore, the migration may be accomplished in a manner that is transparent to the host devices using a volume on one of the data storage devices, and each host device can perform I/O operations on the volume throughout the migration process.

Figure 2:
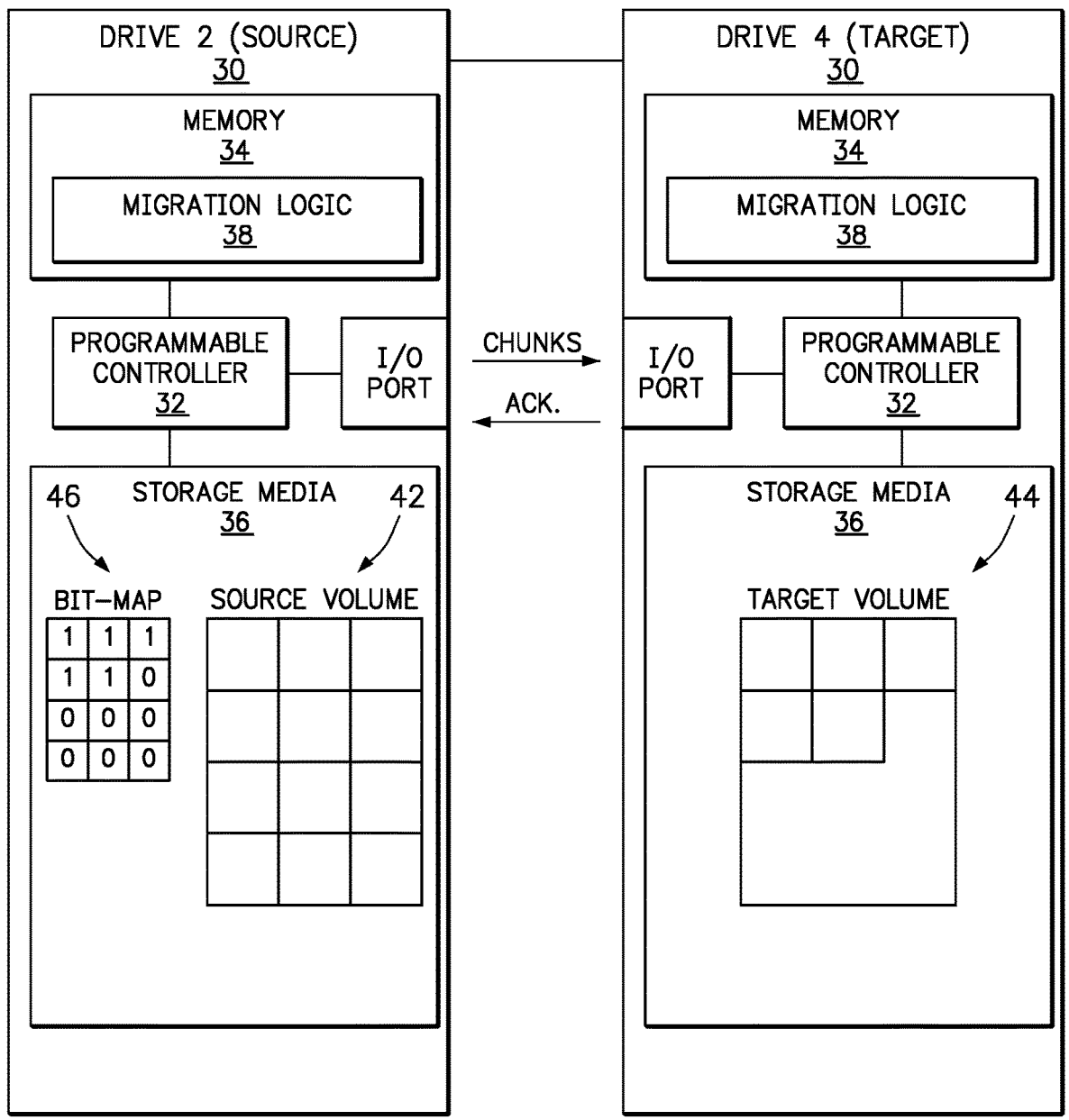
FIG. 2 is a diagram of a first data storage device interacting with a second data storage device to migrate a source volume to a target volume.

FIG. 2 is a diagram of a first data storage device 30 (i.e., Drive 2; the "Source") interacting with a second data storage device 30 (i.e., Drive 4; the "Target") to migrate a source volume 42 to a target volume 44. On Drive 2 (Source) 30, the programmable controller 32 may execute the migration logic 38 loaded in memory 34 in accordance with a "send-migration" request or instruction that Drive 2 receives from the storage management server. Such "send-migration" request will typically identify the source volume 42 that is to be migrated and also identify the data storage device (Drive 4) that will receive the source volume. Similarly, the programmable controller 32 on Drive 4 (Target) 30 may execute the migration logic 38 loaded in memory 34 in accordance with a "receive-migration" request or instruction that Drive 4 receives from the storage management server. Such "receive-migration" request will typically identify the size of the source volume 42 and may also identify the source device (Drive 2). Accordingly, Drive 4 may create the target volume 44 in preparation for receiving and storing data from the source volume 42. Optionally, a "migration identifier" may be used in association with all communications related to the migration, and provide a manner of distinguishing between multiple active volume migrations that may be occurring simultaneously. Once the target device 30 acknowledges that it is ready, the source drive may then initiate migration of the source volume, and no further action is required by the host device or the storage management server until the migration completes.

In order to support I/O operations directed at the source volume 42 while the source volume 42 is being migrated to the target volume 44, the programmable controller 32 of the source drive 30 (Drive 2) first creates a bit-map file 46 that describes, for each chunk of data (illustrated as separate blocks) in the source volume 42, whether the chunk has yet been sent to the target drive 30. This requires one bit per chunk, which is a very small fraction of the total size of the source volume 42. This bit map file 46 need only exist while the source volume 42 is being migrated. Before migration, the bit-map file 46 may contains all logical "0" s, indicating that no chunks have been migrated. As each chunk is sent to the target device and an acknowledgement is received, a bit associated with that chunk may have its value changed to a logical "1" as evidence of a successful transfer of that chunk.

Optionally, the source drive may send data from the source volume to the target drive, in fixed-sized chunks, starting at the lowest addresses of the volume and moving forward sequentially. One preferred size of the chunks is 1 MB in order to get efficient network utilization. Preferably, the size of a chunk will be a multiple of the block size. The target drive may store the incoming data chunks at the same addresses in the newly created target volume, acknowledging the receipt of each chunk back to the source drive. Each time the source drive receives the acknowledgement, the source drive will set the corresponding bit in the bit-map file to 1. Doing this only after the acknowledgement from the target drive ensures that the migration can be restarted after a crash or power failure, with no loss of data. Specifically, if a migration is restarted, it is only necessary to transfer those chunks that are associated with bits of the bit-map indicating that the chunk was not successfully transferred (i.e., a logical value of "0" in this non-limiting example).

Figure 3:
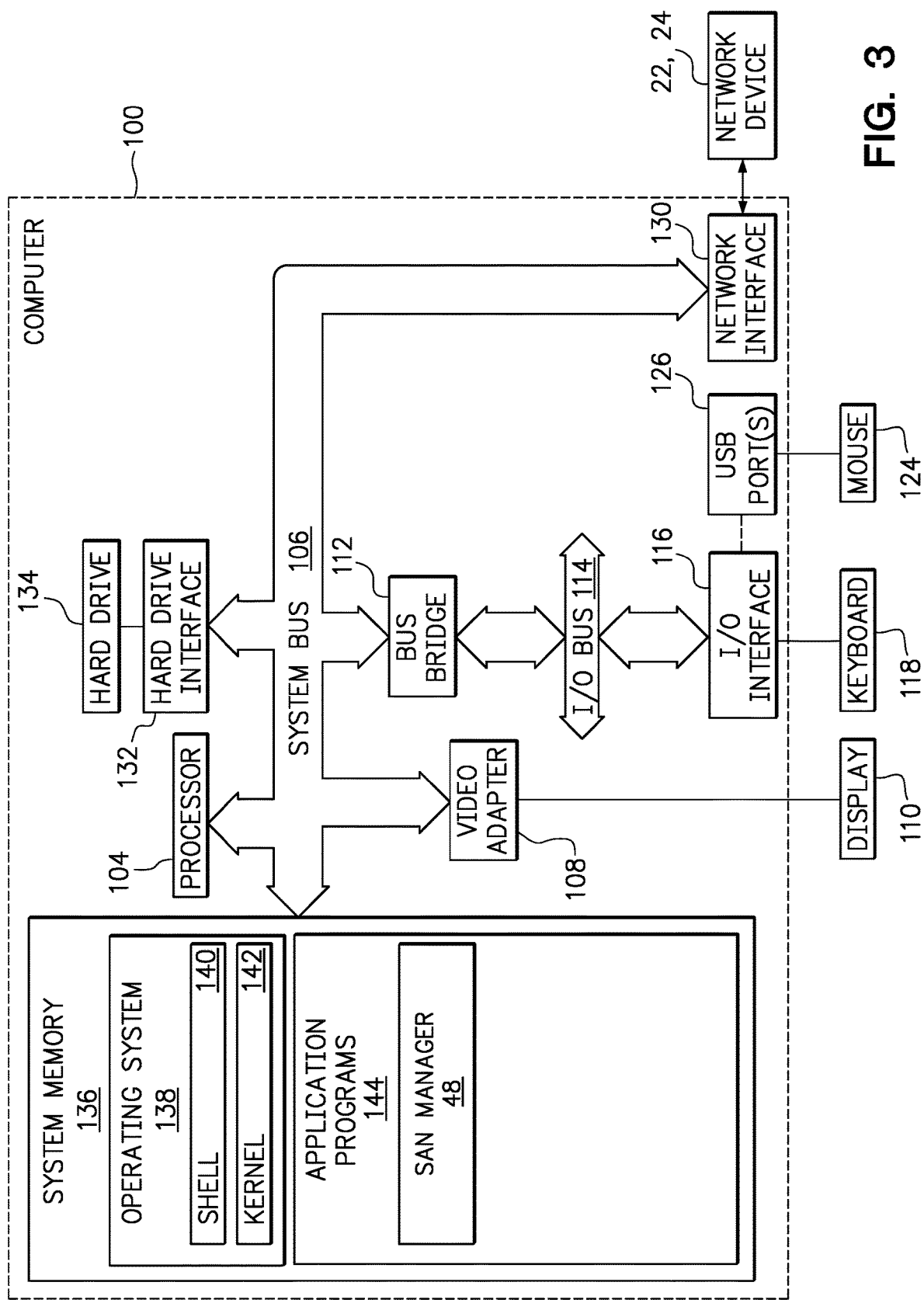
FIG. 3 is a diagram of a computer that may be used to implement the storage management server.

FIG. 3 is a diagram of a computer 100 that is representative of the storage management server 40 according to one or more embodiment. Furthermore, the computer 100 may representative of a host device 60 but with the SAN agent application (program instructions) 62 replacing the SAN manager software (program instructions) 48.

The computer 100 includes a processor unit 104 that is coupled to a system bus 106. The processor unit 104 may utilize one or more processors, each of which has one or more processor cores. A video adapter 108, which drives/supports a display 110, is also coupled to system bus 106. The system bus 106 is coupled via a bus bridge 112 to an input/output (I/O) bus 114. An I/O interface 116 is coupled to the I/O bus 114. The I/O interface 116 affords communication with various I/O devices, including a keyboard 118, and a USB mouse 124 via USB port(s) 126. As depicted, the computer 100 is able to communicate with a network device, such as one of the switches 22, 24 (see FIG. 1) using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory includes additional higher levels of volatile memory (not shown), including, but not limited to, cache memory, registers and buffers. Data that populates the system memory 136 includes the operating system (OS) 138 and application programs 144.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144. Such essential services may include memory management, process and task management, disk management, and mouse and keyboard management. As shown, the computer 100 includes application programs 144 in the system memory of the computer 100, including, without limitation, the SAN manager logic 48, which may be used to implement one or more of the embodiments disclosed herein.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the embodiments.

Figure 4:
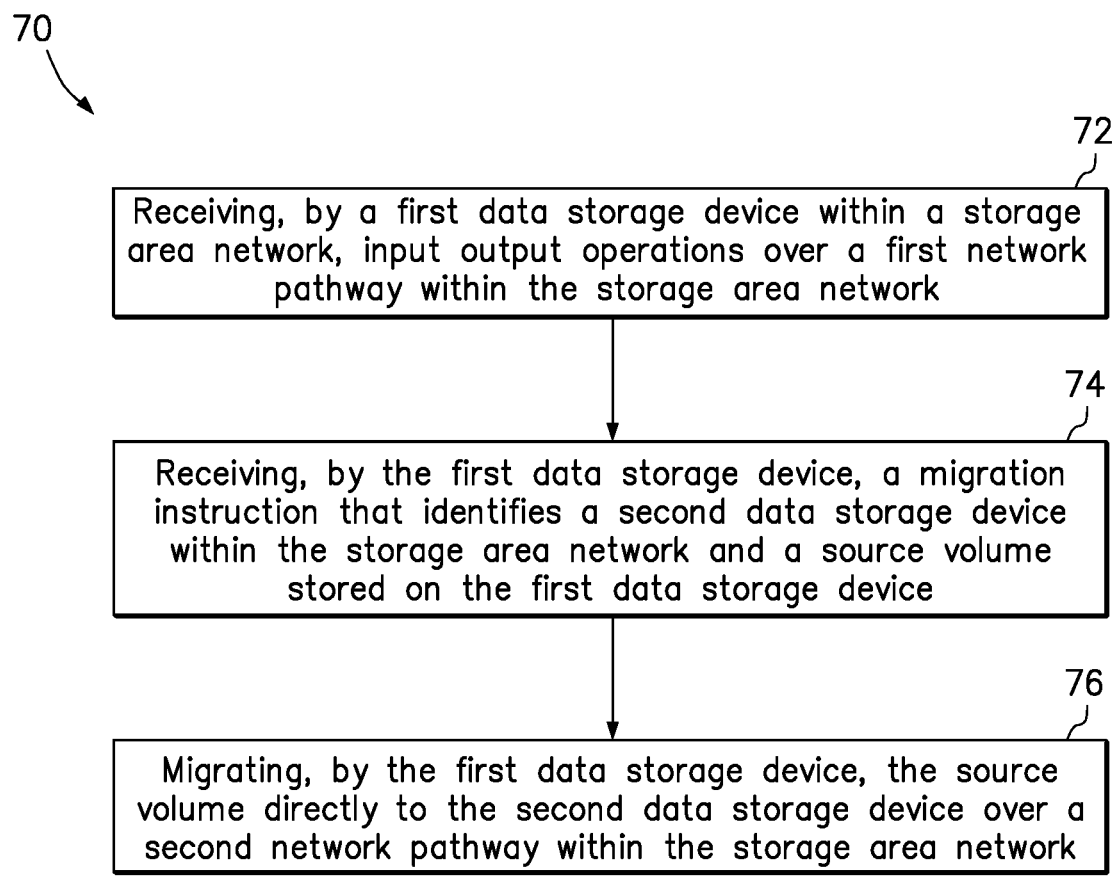
FIG. 4 is a flowchart of a method according to one embodiment.

FIG. 4 is a flowchart of a method 70 according to one embodiment. In step 72, the method includes receiving, by a first data storage device within a storage area network, input output operations over a first network pathway within the storage area network. In step 74, the method further includes receiving, by the first data storage device, a migration instruction that identifies a second data storage device within the storage area network and a source volume stored on the first data storage device. Then, step 76 includes migrating, by the first data storage device, the source volume directly to the second data storage device over a second network pathway within the storage area network.

Figure 5A:
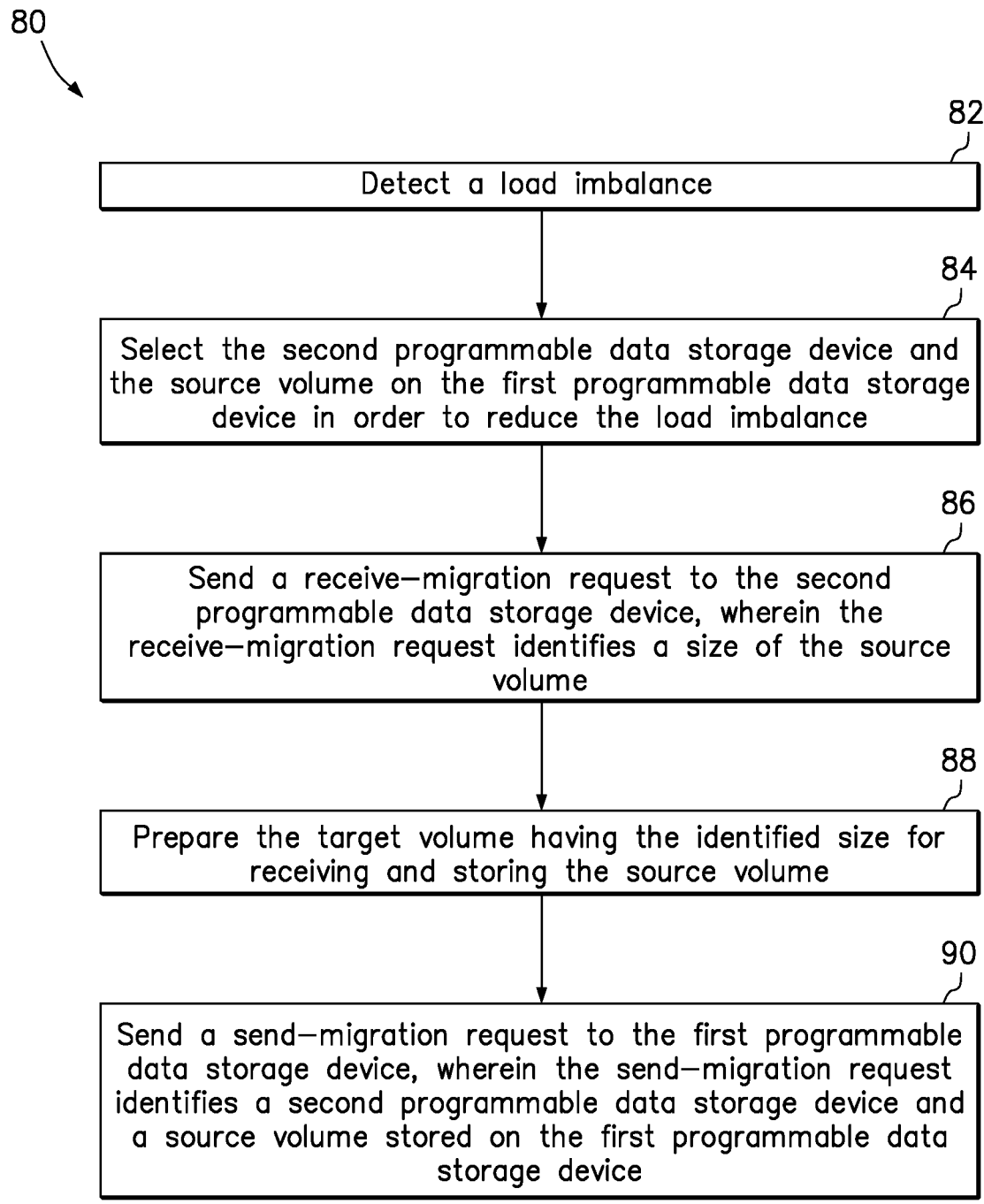
FIGS. 5A-5C are flowcharts of methods according to other specific embodiments.
Figure 5B:
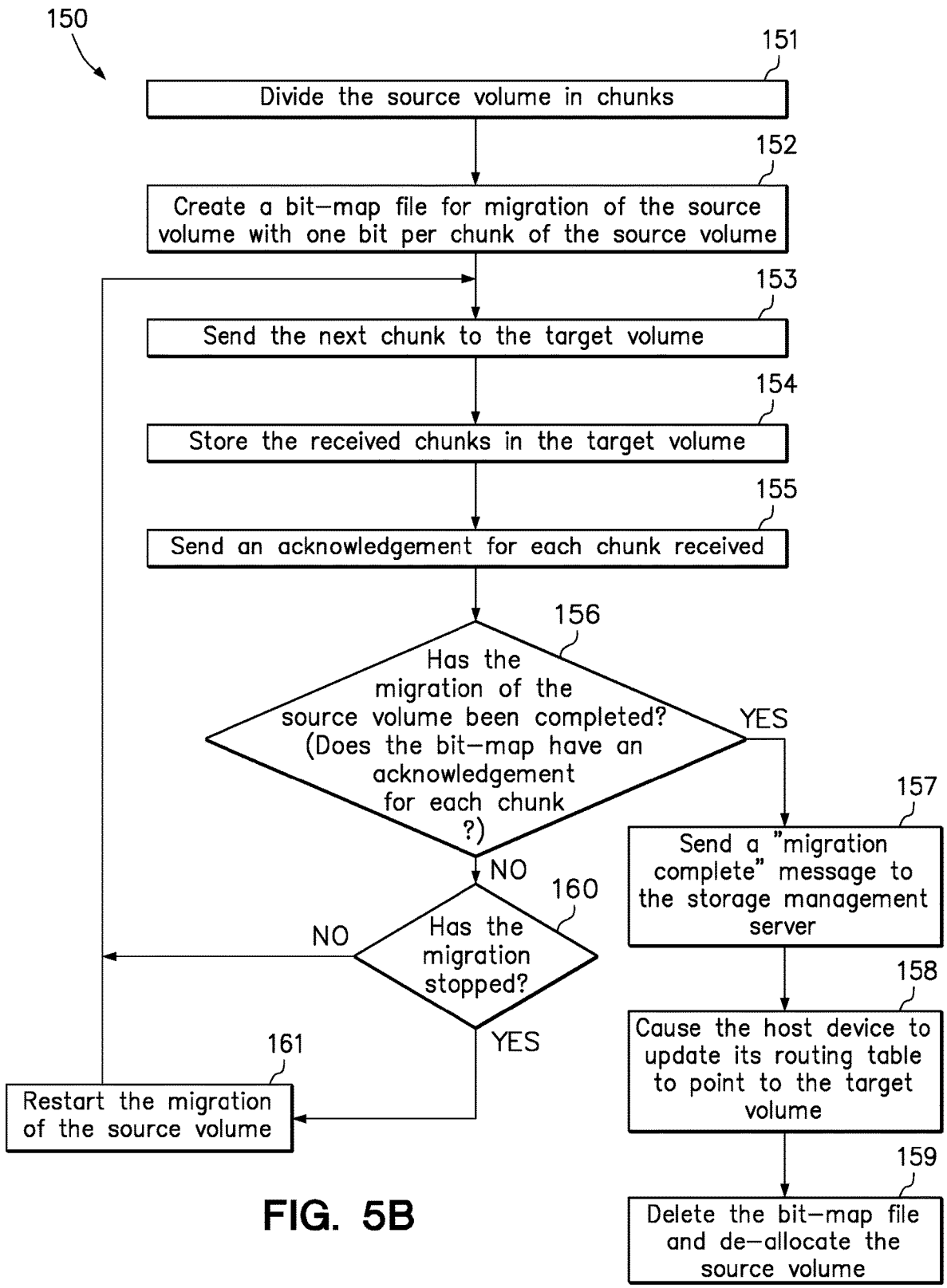
Figure 5C:
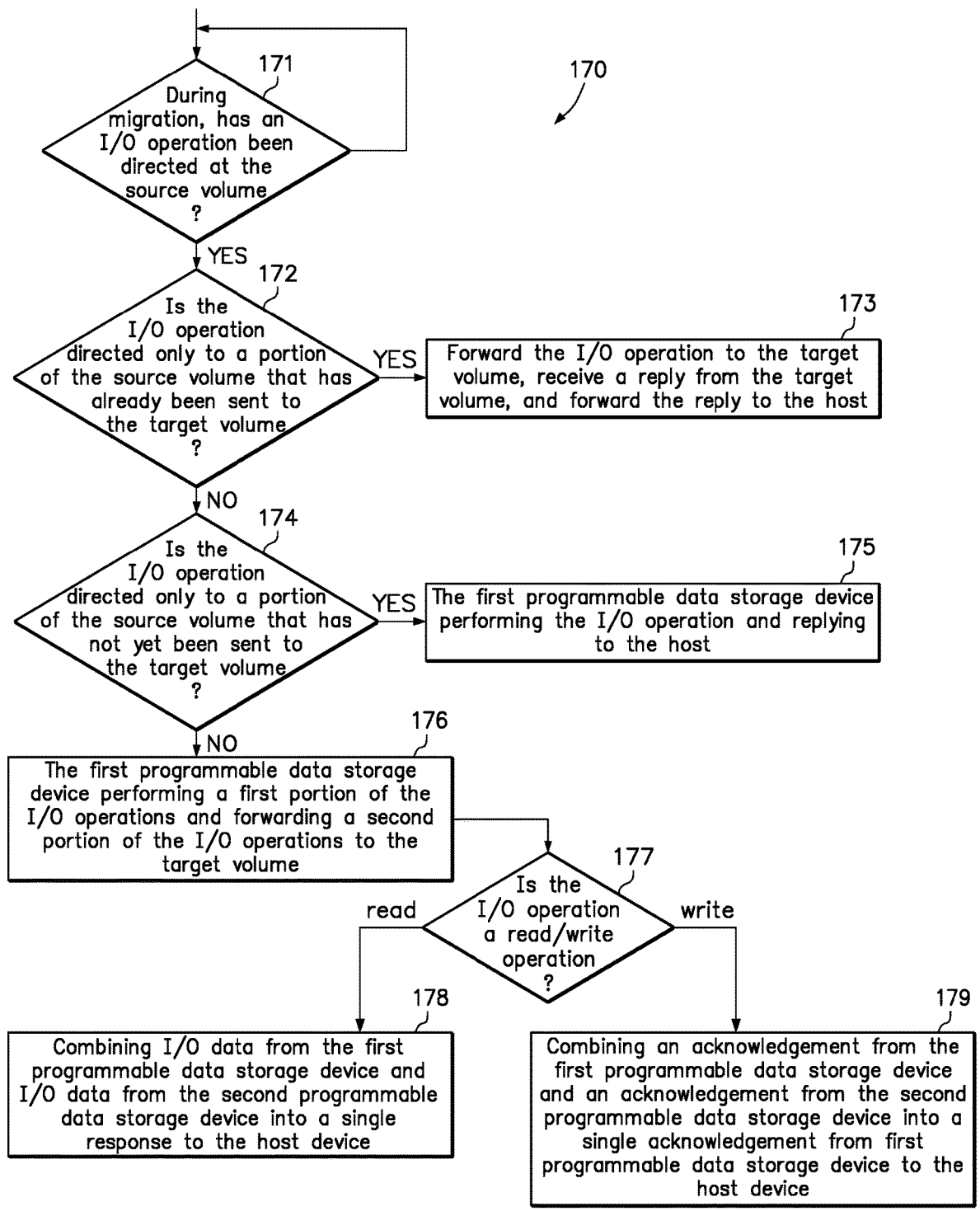

FIGS. 5A-5C are flowcharts of methods according to other specific embodiments. FIG. 5A is a flowchart of a method 80 of preparing to migrate the source volume. In step 82, a storage management server in a storage area network detects a load imbalance between the first and second programmable data storage devices. In step 84, the storage management server selects the second programmable data storage device and the source volume on the first programmable data storage device in order to reduce the load imbalance. In step 86, the storage management server sends a receive-migration request to the second programmable data storage device, wherein the receive-migration request identifies a size of the source volume. In step 88, the second programmable data storage device prepares the target volume having the identified size for receiving and storing the source volume. Then, in step 90, the storage management server sends a send-migration request to the first programmable data storage device, wherein the send-migration request identifies the second programmable data storage device and a source volume stored on the first programmable data storage device.

FIG. 5B is a flowchart of a method 150 of migrating a source volume and tracking progress of the migration using a bit-map. In step 151, the method divides the source volume into chunks, which may include identifying a chunk size and the total number of chunks. In step 152, the first programmable data storage device creates a bit-map file that identifies, for each chunk of the source volume, whether the first programmable data storage device has received an acknowledgement back from the second programmable data storage device. In step 153, the first programmable data storage device sends a next chunk of the source volume to the target volume on the second programmable data storage device without passing the source volume through the storage management server. In step 154, the second programmable data storage device stores the received chunks at addresses in the target volume that are the same as addresses of the chunks from the source volume. In step 155, the second programmable data storage device sends an acknowledgement back to the first programmable data storage device for each chunk received.

In step 156, the method determines whether the migration of the source volume has completed. If the migration has completed, then a "migration complete" message is sent to the storage management server in step 157, the host devices will update its routing table to point to the target volume in step 158, and the first programmable data storage device deletes the bit-map file and de-allocates the source volume in response to completing migration of the source volume per step 159. If the migration has not completed, then step 160 of the method determines whether the migration has stopped. If the migration has not stopped, then the method returns to step 153 to send the next chunk. If the migration has stopped before completing, then step 161 restarts the migration of the source volume from the first programmable data storage device to the second programmable data storage device, including sending only those chunks of the source volume that the bit-map identifies as having not received an acknowledgement back from the second programmable data storage device.

FIG. 5C is a flowchart of a method 170 of handling an I/O operation directed at the source volume during its migration. In step 171, the method determines whether an I/O operation has been directed at the source volume during its migration. Once an I/O operation has been directed at the source volume during its migration as determined in step 171, then step 172 of the method determines if the I/O operation is targeted at a portion of the source volume (i.e., a range of addresses of the source volume) that has already been sent to the target volume. A positive determination in step 172 leads to step 173 in which the source drive will forward the I/O operation to the target volume, receive a reply from the target device, and then will forward the reply back to the host. A negative determination in step 172 leads to determining, in step 174, whether the I/O operation is targeted at a portion of the source volume (i.e., a range of addresses of the source volume) that has not yet been sent to the target volume.

A positive determination in step 174 leads to step 175, in which the source drive will carry out the I/O operation in the normal fashion, exactly as if no migration were taking place. Accordingly, the source device will perform the I/O operation and reply to the host. A negative determination in step 174 leads to step 176, in which the I/O operation is divided into two I/O operations, such that the source drive performs a first portion of the I/O operation (i.e., the portion that is directed to the unmigrated source volume) and forwards a second portion of the I/O operation to the target drive (i.e., the portion that is directed to the migrated target volume).

When the I/O operation is split among the source drive and the target drive as in step 176, the method then determines whether the I/O operation is a read operation or a write operation. If it is a read operation, then step 178 combines I/O data from the first programmable data storage device and I/O data from the second programmable data storage device into a single response from the first programmable data storage device to the host device. If it is a write operation, then step 179 combines an acknowledgement from the first programmable data storage device and an acknowledgement from the second programmable data storage device into a single acknowledgement from first programmable data storage device to the host device.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising non-transitory computer readable storage media having program instructions embodied therewith, the program instructions executable by a processor of a first data storage device within a storage area network to:
   receive input output operations over a first network pathway within the storage area network;
   receive a migration instruction that identifies a second data storage device within the storage area network and a source volume stored on the first data storage device;
   migrate the source volume directly to the second data storage device over a second network pathway within the storage area network;
   receive an input output operation from a host device during migration of the source volume, wherein the input output operation is directed at a first portion of the source volume that has not yet been sent to the second data storage device and a second portion of the source volume that has already been sent to the second data storage device;
perform the input output operation directed at the first portion of the source volume on the first data storage device; and
forward the input output operation directed at the second portion of the source volume to the second data storage device.

2. The computer program product of claim 1, wherein the program instructions executable by a processor to migrate the source volume directly to the second data storage device over a second network pathway within the storage area network, includes program instructions executable by a processor to send the source volume to the second data storage device in chunks.

3. The computer program product of claim 2, wherein the program instructions are further executable by the processor to:
receive an acknowledgement for each chunk of the source volume received by the second data storage device; and
update a bit-map file that identifies, for each chunk of the source volume, whether an acknowledgement has been received.

4. The computer program product of claim 3, wherein the program instructions are further executable by the processor to:
detect that the migration stopped before completing; and
restart the migration of the source volume to the second data storage device, including sending only those chunks of the source volume for which the bit-map identifies that no acknowledgement has been received.

5. The computer program product of claim 3, wherein the program instructions are further executable by the processor to:
delete the bit-map file and de-allocate the source volume in response to complete migration of the source volume to the second data storage device.

6. The computer program product of claim 1, wherein the program instructions are further executable by the processor to:
receive a reply from the second data storage device; and
forward the reply to the host device.

7. The computer program product of claim 6, wherein the input output operation is a read request and the reply is data responsive to the read request.

8. The computer program product of claim 6, wherein the input output operation is a write request and the reply is an acknowledgement that the requested write has been performed.

9. The computer program product of claim 1, wherein the program instructions are further executable by the processor to:
receive a reply from the second data storage device, wherein the reply is responsive to the input output operation directed at the second portion of the source volume; and
send a consolidated response to the host device.

10. The computer program product of claim 9, wherein the input output operation is a read operation, and wherein the program instructions are further executable by the processor to:
combine output data from the first data storage device and output data received in the reply from the second data storage device into the consolidated response to the host device.

11. The computer program product of claim 9, wherein the input output operation is a write operation, and wherein the program instructions are further executable by the processor to:
combining an acknowledgement from the first data storage device and an acknowledgement from the second data storage device into a consolidated acknowledgement from the first data storage device to the host device.

12. An apparatus, comprising:
at least one storage device including non-transitory computer readable storage media for storing program instructions; and
at least one processor for processing the program instructions to:
receive input output operations over a first network pathway within a storage area network;
receive a migration instruction that identifies a source volume stored on a first data storage device operatively coupled to the processor and a second data storage device within the storage area network to receive the source volume;
migrate the source volume directly to the second data storage device from the first data storage device over a second network pathway within the storage area network;
receive an input output operation from a host device during migration of the source volume, wherein the input output operation is directed at a first portion of the source volume that has not yet been sent to the second data storage device and a second portion of the source volume that has already been sent to the second data storage device;
perform the input output operation directed at the first portion of the source volume on the first data storage device; and
forward the input output operation directed at the second portion of the source volume to the second data storage device.

13. The apparatus of claim 12, wherein the first data storage device has a first network port operatively coupled to the processor for accessing the first network pathway and a second network port operatively coupled to the processor for accessing the second network pathway.

14. The apparatus of claim 12, wherein the at least one processor further processes the program instructions to:
send the source volume to the second data storage device in chunks.

15. The apparatus of claim 14, wherein the at least one processor further processes the program instructions to:
receive an acknowledgement for each chunk of the source volume received by the second data storage device; and
update a bit-map file that identifies, for each chunk of the source volume, whether an acknowledgement has been received.

16. The apparatus of claim 15, wherein the at least one processor further processes the program instructions to:
detect that the migration stopped before completing; and
restart the migration of the source volume to the second data storage device, including sending only those chunks of the source volume for which the bit-map identifies that no acknowledgement has been received.

17. The apparatus of claim 15, wherein the at least one processor further processes the program instructions to:
receive a reply from the second data storage device; and
forward the reply to the host device.

18. The apparatus of claim 17, wherein the input output operation is a read request and the reply is data responsive to the read request.

19. The apparatus of claim 17, wherein the input output operation is a write request and the reply is an acknowledgement that the requested write has been performed.

20. A method comprising:
receiving, by a first data storage device within a storage area network, input output operations over a first network pathway within the storage area network;
receiving, by the first data storage device, a migration instruction that identifies a second data storage device within the storage area network and a source volume stored on the first data storage device;
migrating, by the first data storage device, the source volume directly to the second data storage device over a second network pathway within the storage area network;
receiving an input output operation from a host device during migration of the source volume, wherein the input output operation is directed at a first portion of the source volume that has not yet been sent to the second data storage device and a second portion of the source volume that has already been sent to the second data storage device;
performing the input output operation directed at the first portion of the source volume on the first data storage device; and
forwarding the input output operation directed at the second portion of the source volume to the second data storage device.

21. The method of claim 20, wherein migrating the source volume directly to the second data storage device over a second network pathway within the storage area network, includes sending the source volume to the second data storage device in chunks, the method further comprising:
receiving an acknowledgement for each chunk of the source volume received by the second data storage device; and
updating a bit-map file that identifies, for each chunk of the source volume, whether an acknowledgement has been received.

22. The method of claim 21, further comprising:
detecting that the migration stopped before completing; and
restarting the migration of the source volume to the second data storage device, including sending only those chunks of the source volume for which the bit-map identifies that no acknowledgement has been received.

23. The method of claim 20, further comprising:
receiving an input output operation from a host device during migration of the source volume, wherein the input output operation is directed at a portion of the source volume that has already been sent to the second data storage device;
forwarding the input output operation to the second data storage device;
receiving a reply from the second data storage device; and
forwarding the reply to the host device.

24. The method of claim 20, further comprising:
receiving a reply from the second data storage device; and
sending a consolidated response to the host device.

* * * * *